US011017088B2

(12) United States Patent
Luthra et al.

(10) Patent No.: US 11,017,088 B2
(45) Date of Patent: May 25, 2021

(54) CROWDSOURCED, SELF-LEARNING SECURITY SYSTEM THROUGH SMART FEEDBACK LOOPS

(71) Applicant: MICROSOFT TECHNOLOGY LICENSING, LLC, Redmond, WA (US)

(72) Inventors: Rajat Luthra, Redmond, WA (US); Maria Puertas Calvo, Seattle, WA (US); Sayed Hassan Abdelaziz, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 230 days.

(21) Appl. No.: 16/165,247

(22) Filed: Oct. 19, 2018

(65) Prior Publication Data
US 2020/0089887 A1 Mar. 19, 2020

Related U.S. Application Data

(60) Provisional application No. 62/732,484, filed on Sep. 17, 2018.

(51) Int. Cl.
*G06F 21/57* (2013.01)
*H04L 29/06* (2006.01)
*G06N 20/00* (2019.01)

(52) U.S. Cl.
CPC ............. *G06F 21/57* (2013.01); *G06N 20/00* (2019.01); *H04L 63/10* (2013.01); *G06F 2221/034* (2013.01)

(58) Field of Classification Search
CPC ... H04L 63/10; H04L 63/1433; H04L 63/102; G06N 3/0445; G06N 3/0454; G06N 5/003; G06N 20/10; G06N 20/00; G06N 20/20; G06F 21/552; G06F 21/57; G06F 2221/034; G06F 21/577; G06F 21/554
See application file for complete search history.

(56) References Cited

U.S. PATENT DOCUMENTS 9,458,987 B2   10/2016  Jungwirth et al.
9,558,346 B1 *  1/2017  Kolman .............. H04L 63/1441
(Continued)

OTHER PUBLICATIONS

"International Search Report and Written Opinion Issued in PCT Application No. PCT/US19/039665", dated Sep. 17, 2019, 13 Pages.

*Primary Examiner* — Kevin Bechtel
*Assistant Examiner* — Hamid Talaminaei
(74) *Attorney, Agent, or Firm* — Workman Nydegger

(57) ABSTRACT

Systems are provided for utilizing crowdsourcing and machine learning to improve computer system security processes associated with user risk profiles and sign-in profiles. Risk profiles of known users and logged sign-ins are confirmed by user input as either safe or compromised. This input is used as crowdsourced feedback to generate label data for training/refining machine learning algorithms used to generate corresponding risky profile reports. The risky profile reports are used to provide updated assessments and initial assessments of known users and logged sign-ins, as well as newly discovered users and new sign-in attempts, respectively. These assessments are further confirmed or modified to further update the machine learning and risky profile reports.

20 Claims, 6 Drawing Sheets

(56) References Cited

U.S. PATENT DOCUMENTS

| | | | |
|---|---|---|---|
| 10,212,174 B2* | 2/2019 | Muddu | H04L 43/062 |
| 10,630,673 B1* | 4/2020 | Lingampally | H04L 63/0815 |
| 2017/0279834 A1 | 9/2017 | Vasseur et al. | |
| 2018/0288060 A1* | 10/2018 | Jackson | H04L 63/102 |
| 2019/0116193 A1* | 4/2019 | Wang | H04L 63/1416 |

* cited by examiner

🔎 Search

Filter Tools
⚆ Risky users
⚠ Risky sign-ins
...
Other

↻ Refresh  ↓ Download  △ Confirm compromised  ⊕ Confirm safe

| User | Application | Sign-in status | Date | IP address | Sign-in risk state |
|---|---|---|---|---|---|
| Enter user | Enter app name | All | Last 7 days | Enter IP address | Active, Remediated ▾ |
| Sign-in risk level (Total) | Sign-in risk level | Conditional access | Multi-factor authentication | Risk event type(s) | |
| Low, Medium, High ▾ | Low, Medium, High ▾ | All | All | Unfamiliar features ▾ | |

Apply  Reset

| ■USER ^ | APPLICATION ^ | SIGN-IN STATUS | DATE | IP ADDRESS | RISK STATE | RISK LEVEL (TOTAL) | RISK LEVEL (REALTIME) | |
|---|---|---|---|---|---|---|---|---|
| ■ Garret O | Office.com | Success | 7/3/17 | 128.93.34.24 | At risk | Medium | Medium | ⋮ |
| ☐ Alvin V | Azure Portal | Failure | 7/2/17 | 234.32.45.46 | Confirmed Safe | – | Low | ⋮ |
| ☐ Toshi H | Azure Portal | Success | 7/2/17 | 94.12.53.45 | At risk | Medium | Medium | ⋮ |
| ☐ Elissa N | Azure Portal | Failure | 7/2/17 | 123.34.65.1 | At risk | Medium | Medium | ⋮ |
| ☐ Audrey O | Microsoft Office | Success | 7/2/17 | 231.23.54.245 | At risk | Low | Low | ⋮ |
| ☐ Henry H | Microsoft Office | Success | 7/2/17 | 231.23.54.245 | At risk | Medium | Medium | ⋮ |
| ☐ Kate D | Microsoft Office | Failure | 7/2/17 | 83.23.95.199 | At risk | Medium | Medium | ⋮ |
| ☐ Mandy M | Office 365 | Success | 7/1/17 | 234.36.12.9 | At risk | Low | Low | ⋮ |
| ☐ Gail S | Office 365 Exch.. | Success | 7/1/17 | 64.95.23.65 | At risk | Medium | Medium | ⋮ |
| ☐ Michael L | Office 365 Exch.. | Success | 7/1/17 | 221.23.54.221 | At risk | Medium | Medium | ⋮ |

...

Details       >

△ Confirm compromised  ⊕ Confirm safe  ← 310
Sign-in info  Risk info (Identity Protection 2.0)  Device info  Conditional Access  MFA

| RISK EVENT | RISK EVENT STATE | TIME DETECTED | TYPE | |
|---|---|---|---|---|
| ⚐ Impossible sign-ins from atypical locations | Confirmed safe | 7/2/17, 11:22 AM | Offline | |
| First IP address  128.95.198.1 | First time | 7/2/17, 11:08 AM | | Risk event level |
| Second IP address  234.12.45.46 | Second time | 7/2/17, 11:22 AM | | Risk event detail |
| First location  Tokyo, Japan | Time difference | 00:14 | | |
| Second location  Mexico City, Mexico | Client | Windows 10; Chrome 59.0 | | |
| Sign-ins from unfamiliar locations | Confirmed safe | 7/2/17, 11:21 AM | Realtime | |
| Sign-ins from anonymous IP adress | Confirmed safe | 7/1/17, 11:20 AM | Realtime | |

← 320

CROWDSOURCED, SELF-LEARNING SECURITY SYSTEM THROUGH SMART FEEDBACK LOOPS

CROSS-REFERENCE TO RELATED APPLICATIONS

This application claims the benefit of and priority to U.S. Provisional Patent Application Ser. No. 62/732,484 filed on Sep. 17, 2018 and entitled "CROWDSOURCED, SELF-LEARNING SECURITY SYSTEM THROUGH SMART FEEDBACK LOOPS," which application is expressly incorporated herein by reference in its entirety.

BACKGROUND

Computer systems and corresponding software applications have become very sophisticated, enabling users to access, manipulate and store data in a variety of formats and to perform numerous functions with that data. For instance, some software applications are configured to perform word processing, design, audio/visual processing, data analysis, email processing, and so forth.

In many cases, software applications are configured to restrict user rights based on permissions and policies associated with their computer resources. This is particularly true for many distributed enterprise systems and applications that enable subscribed users to remotely access data and services through a web browser or cloud portal. For example, in some instances, users can log into a cloud portal and access computing resources such as virtual machines or other resources that are remotely hosted by providing credentials that correspond with an authorized user account.

The use of login credentials for authenticating and validating authorized users is a well-known technique for controlling access to computing resources. However, this type of security procedure can be circumvented by unauthorized and sophisticated intruders that spoof or otherwise obtain valid login credentials. In some instances, cyberattacks, such as brute force attacks, denial of service attacks, spyware, viruses and other malware can also be used to circumvent security measures and policy restrictions placed on computing resources and/or can be used to compromise or harm those computing resources.

To help mitigate against the proliferation of unauthorized use and risky behaviors, some enterprises associate user risk profiles with their user accounts to further control/restrict user access to their computer resources. In particular, some systems correlate known users and their login credentials, as well as other profile data, with different risk levels and corresponding security policies to control the access that is provided by the requested computing resources. In such instances, users having high risk profiles are associated with reduced privileges and access rights relative to users having low or lower risk profiles. If a user is later discovered to be high risk, their profile can be updated to reflect their heightened risk level and to restrict their access. However, these types of systems can still be circumvented, such as when a bad entity creates or uses an account with a lower level risk and performs a bad act before their corresponding user risk profile can be updated to reflect their risky behavior.

The foregoing problem is exasperated for systems that manage high volumes of user accounts among many distributed system, which can significantly delay or pragmatically prevent the updating of the user risk profiles in a timely manner. For instance, distributed systems managing hundreds of thousands of user accounts or even millions of user accounts are not able to track and correlate new user accounts with detected bad user accounts in an effective manner, even when they have historical data reflecting repeated actions of the bad actors utilizing different accounts.

Likewise, systems that manage only a small set of user accounts can also suffer from related problems by failing to have any historical data for bad actors, or only limited historical data, which effectively prevents such systems from being able to update their risk profiles at all to reflect the behaviors of those bad actors, particularly before those actors have even launched any attack on a system for the first time, even though those bad actors may have been known to have launched previous attacks against other systems.

In view of the foregoing, there is an ongoing need to improve computer security systems and, particularly, the manner in which computer systems are able to control access to their restricted computer resources and, even more particularly, to the manner in which computer security systems that utilize risk profiles are able to manage and update the risk profiles for enhancing computer security and control access to restricted computer resources.

Despite the foregoing description, it will be appreciated that the subject matter of the disclosed embodiments is not limited to only embodiments that solve the particular disadvantages, or that operate only in environments such as those described above. Rather, this background is only provided to illustrate one exemplary technology area where some embodiments described herein may be practiced.

BRIEF SUMMARY

Disclosed embodiments are directed to systems and methods for utilizing crowdsourcing and machine learning to improve computer security systems that are associated with or based on user risk profiles and sign-in profiles. In some embodiments, these systems and methods can be used to improve upon the manner in which computer systems dynamically control access to their restricted computer resources and, even more particularly, to dynamically manage and update user risk profiles and sign-in risk profiles, based on crowdsourced feedback loops, to more effectively control access to restricted computer resources and/or to perform proactive remediation of risk (e.g., credential resets, expiry or demotion of account privileges and access rights, and so forth).

In some instances, the risk profiles of known users and logged sign-ins are validated or modified by user input through user interfaces that access and display filtered views of the user accounts and logged sign-in attempts. This input is used as crowdsourced feedback to generate label data for training/refining or otherwise improving machine learning algorithms that generate or update corresponding risky profile reports. These risky profile reports are subsequently used to provide updated assessments and initial assessments of known users and logged sign-ins, as well as newly discovered users and new sign-in attempts, respectively. These assessments are further confirmed or modified to even further update the machine learning and risky profile reports in a dynamic and responsive manner.

Some embodiments are specifically associated with embodiments for improving computer system security for computer systems that base their security at least partially on sign-in risk profiles. In these embodiments, a computing system obtains one or more sign-in reports that identifies a plurality of sign-in attempts and a corresponding sign-in risk profile for each sign-in attempt of the plurality of sign-in attempts. Then, the computer generates an interface display that identifies the plurality of sign-in attempts and the sign-in risk profile for each corresponding sign-in attempt, along with selectable display objects that are operable, when selected, to confirm or modify each sign-in risk profile. Next, user input is received for selectably confirming or modifying the various sign-in risk profiles and the computer system, responsively, confirms or modifies the one or more corresponding sign-in risk profiles. Thereafter, or concurrently, the computer system generates a label data file that contains a listing of the corresponding sign-in risk profiles along with identifiers that specify each corresponding sign-in risk profile in the listing as either a false positive, false negative, true positive or true negative, based on the one or more sign-in risk reports and the user input. Finally, the label data file is used to improve the machine learning modules/tools and/or to generate or modify a risk profiles report that is used by a risk assessment engine to generate sign-in risk scores. These risk scores are then used to generate or update the one or more sign-in risk reports.

Some embodiments are specifically associated with embodiments for improving computer system security for computer systems that base their security at least partially on user risk profiles. In these embodiments, a computing system obtains one or more user risk reports identifying a plurality of users and a corresponding user risk profile for each user in the plurality of users. Next, the computer system generates an interface display that identifies the plurality of users in the one or more user risk reports and their corresponding risk profile that specifies a risk level and a risk state, along with one or more selectable display objects that, when selected, are operable for confirming, dismissing or otherwise modifying the specified risk state of each user. Then, upon receiving user input selecting one or more of the selectable display objects for one or more corresponding user risk profiles, the computing system responsively confirms, dismisses or otherwise changes the risk state of the one or more corresponding user risk profiles. Thereafter, or concurrently, the computing system generates a label data file that contains a listing of the corresponding user risk profiles and that specifies each corresponding user risk profile in the listing as either a false positive, false negative, true positive or true negative, based on the one or more user risk reports and the user input. The label data file is then used to improve the machine learning modules/tools and/or to generate or modify a risk profiles report that is used by a risk assessment engine to generate user risk scores. These user risk scores are then used to generate or update the one or more user risk reports.

In some embodiments, each of the foregoing processes are performed iteratively and, in some instances, in combination. Also, the user input and risk profiles are sometimes associated with different organizations, thereby providing enhanced crowdsourced training data for the machine learning systems to more dynamically and responsively update the user risk profiles and the sign-in risk profiles in a manner that can significantly improve computer system security systems that rely on such risk profiles.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which:

FIG. 3 illustrates one embodiment of a user interface that is incorporated within or utilized by the disclosed embodiments for improving user identity protection and corresponding computing system security that is based on risk profiles;

DETAILED DESCRIPTION

As indicated above, the disclosed embodiments relate to systems and methods for improving user identity protection and corresponding computer security systems that are associated with or based on user risk profiles and sign-in profiles and, even more particularly, to embodiments for dynamically managing and updating user risk profiles and sign-in profiles associated with user identities, based on crowdsourced feedback loops, to more effectively control access to restricted computer resources.

In some instances, the risk profiles of known users and logged sign-ins are validated or modified by user input through user interfaces that access and display filtered views of the user accounts and logged sign-in attempts. This crowdsourced input is used to generate label data for training/refining machine learning algorithms that generate or update corresponding risky profile reports. These risky profile reports are subsequently used to provide updated assessments and initial assessments of known users and logged sign-ins, as well as newly discovered users and new sign-in attempts, respectively. These assessments are further used, based on crowdsourced feedback, to even further update/improve the machine learning and risky profile reports in a dynamic and responsive manner.

It will be appreciated from an understanding of this disclosure, that the crowdsourcing feedback loops and other mechanisms described herein can significantly improve the responsiveness, accuracy and effectiveness of computer system security, particularly the security of computer systems that rely on or that are based on user risk profiles and/or sign-in risk profiles. For instance, by way of example, the current embodiments can be used to update user risk profiles of user accounts dynamically based on the actions detected with other user accounts and which can be used to more dynamically restrict rights of a bad actor before that bad actor can even launch a first attack against a particular system and/or to provide more proactive remediation of risk (e.g., credential resets, expiry or demotion, etc.).

Figure 1:
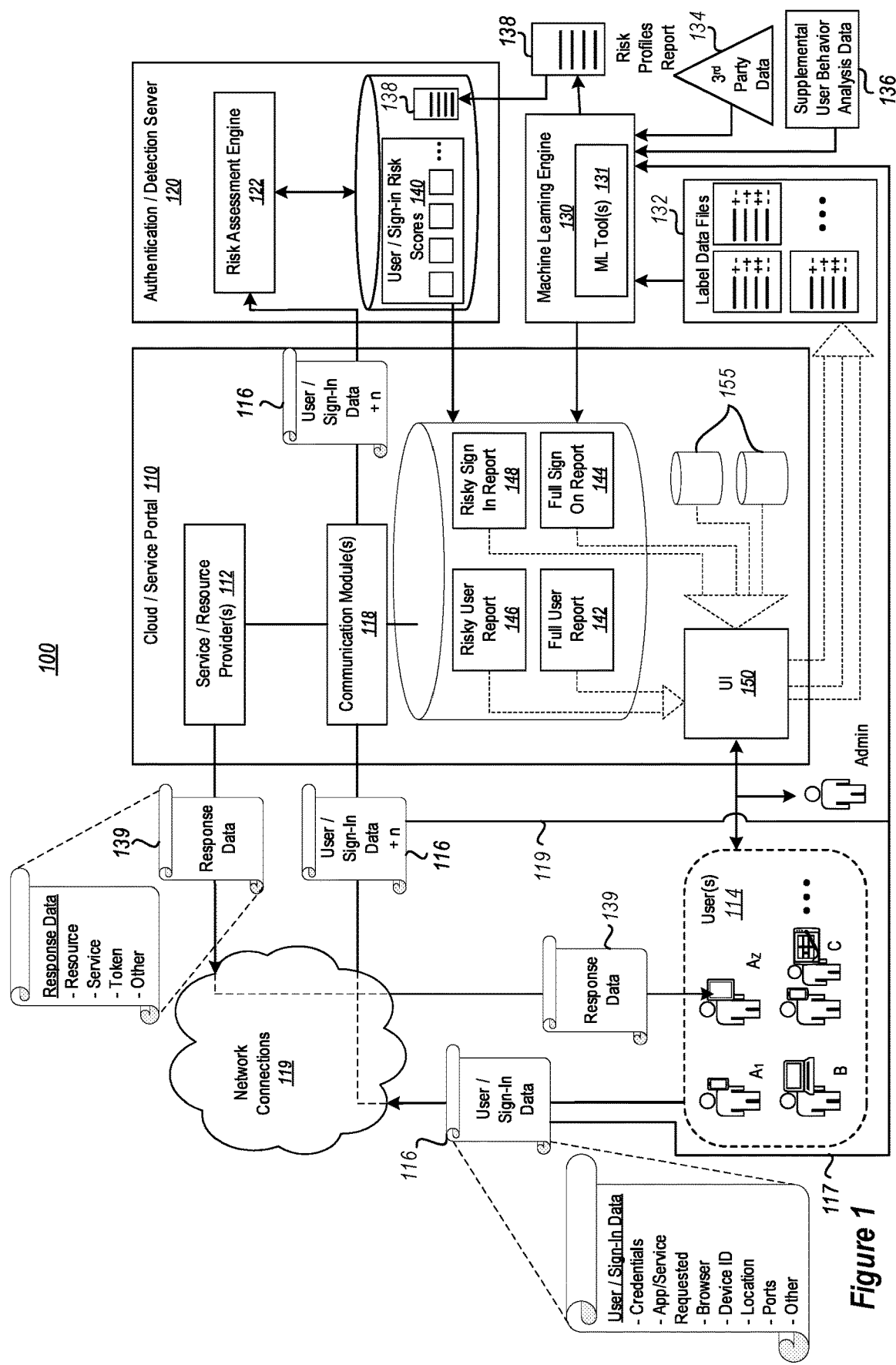
FIG. 1 illustrates a computing environment of a computing system comprising a cloud service that combines multiple computer systems and that is incorporated within or utilized by the disclosed embodiments for improving user identity protection and corresponding computing system security that is based on risk profiles.
Figure 2:
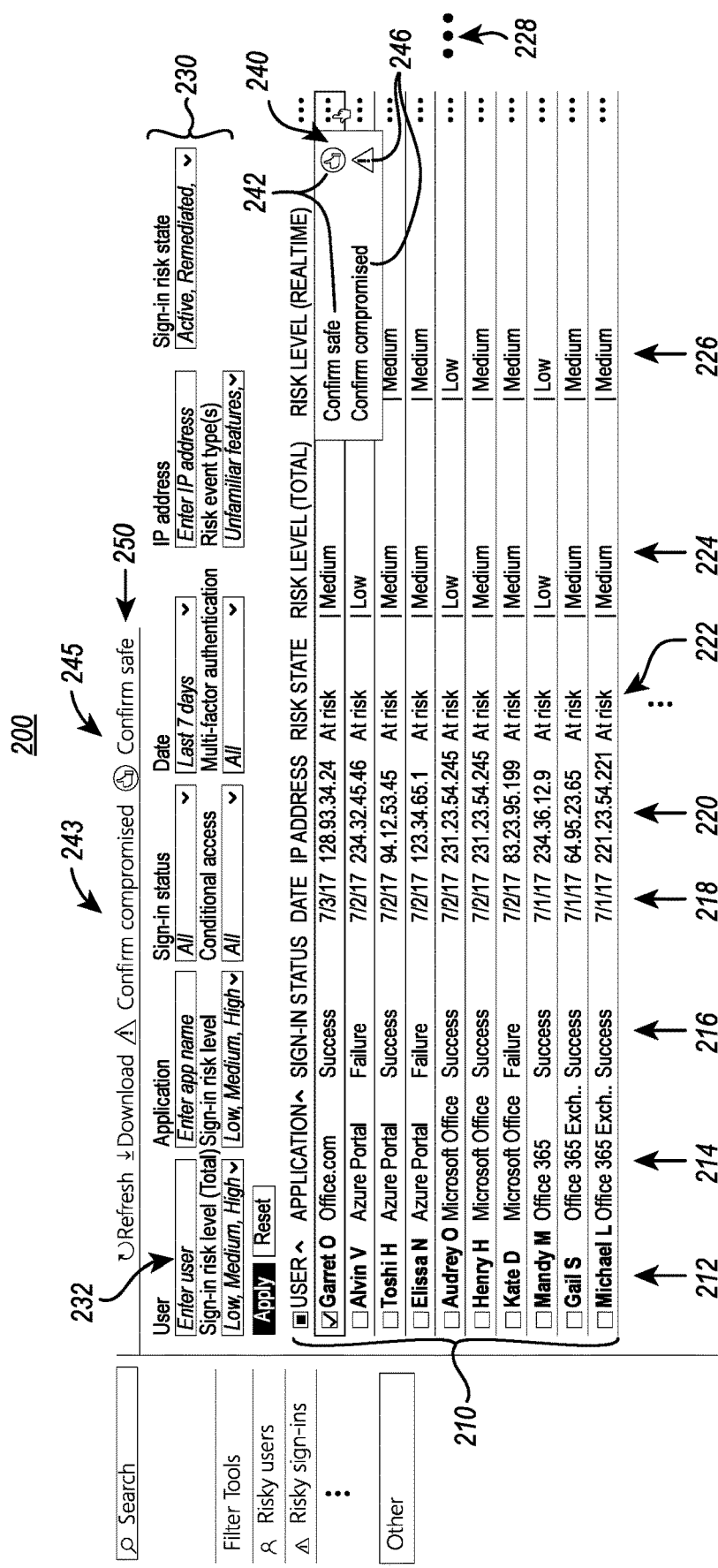
FIG. 2 illustrates one embodiment of a user interface that is incorporated within or utilized by the disclosed embodiments for improving user identity protection and corresponding computing system security that is based on risk profiles.
Figure 4:
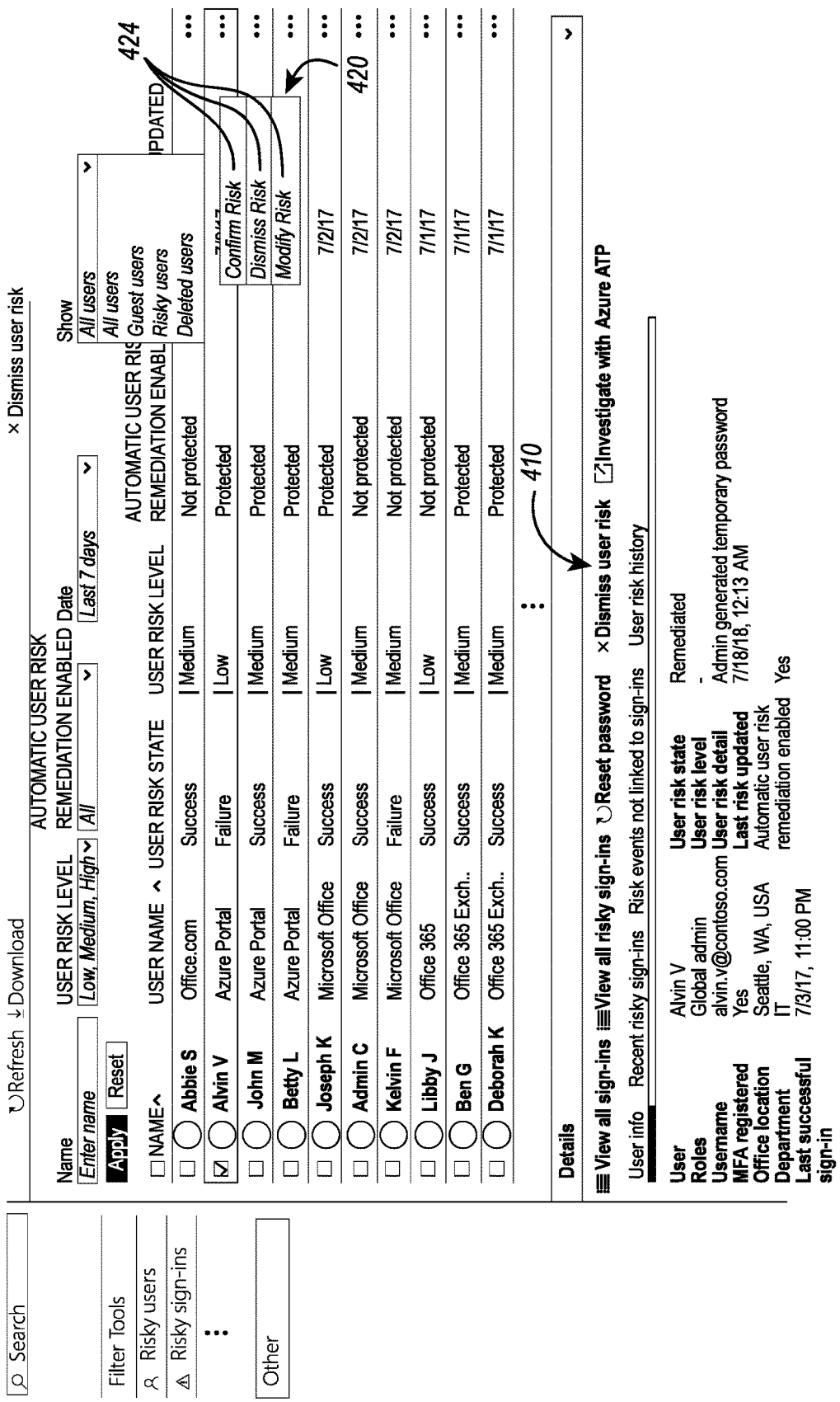
FIG. 4 illustrates one embodiment of a user interface that is incorporated within or utilized by the disclosed embodiments for improving user identity protection and corresponding computing system security that is based on risk profiles.
Figure 5:
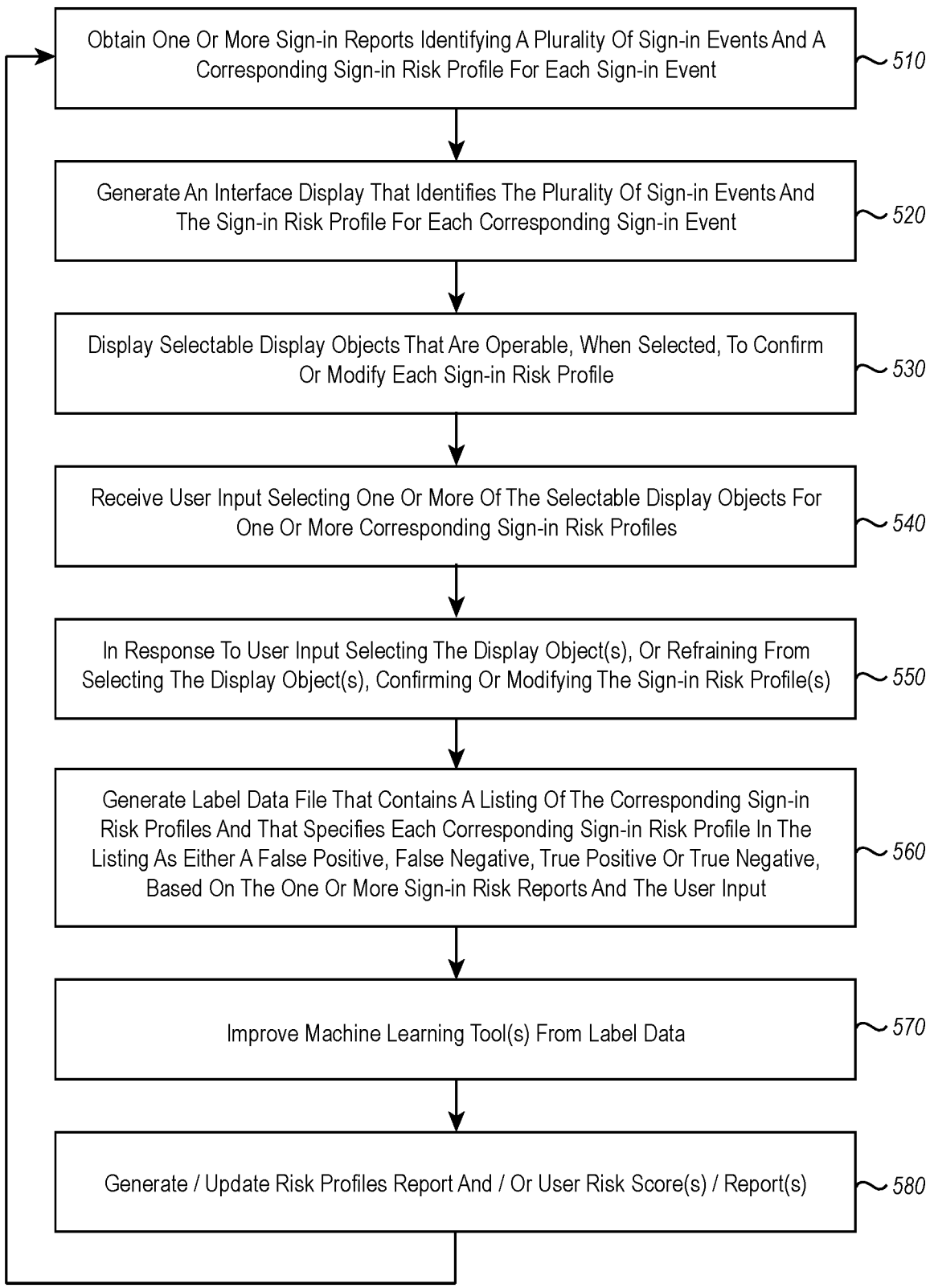
FIG. 5 illustrates a flowchart of acts associated with disclosed methods and embodiments for improving user identity protection and corresponding computer system security associated with sign-in risk profiles.
Figure 6:
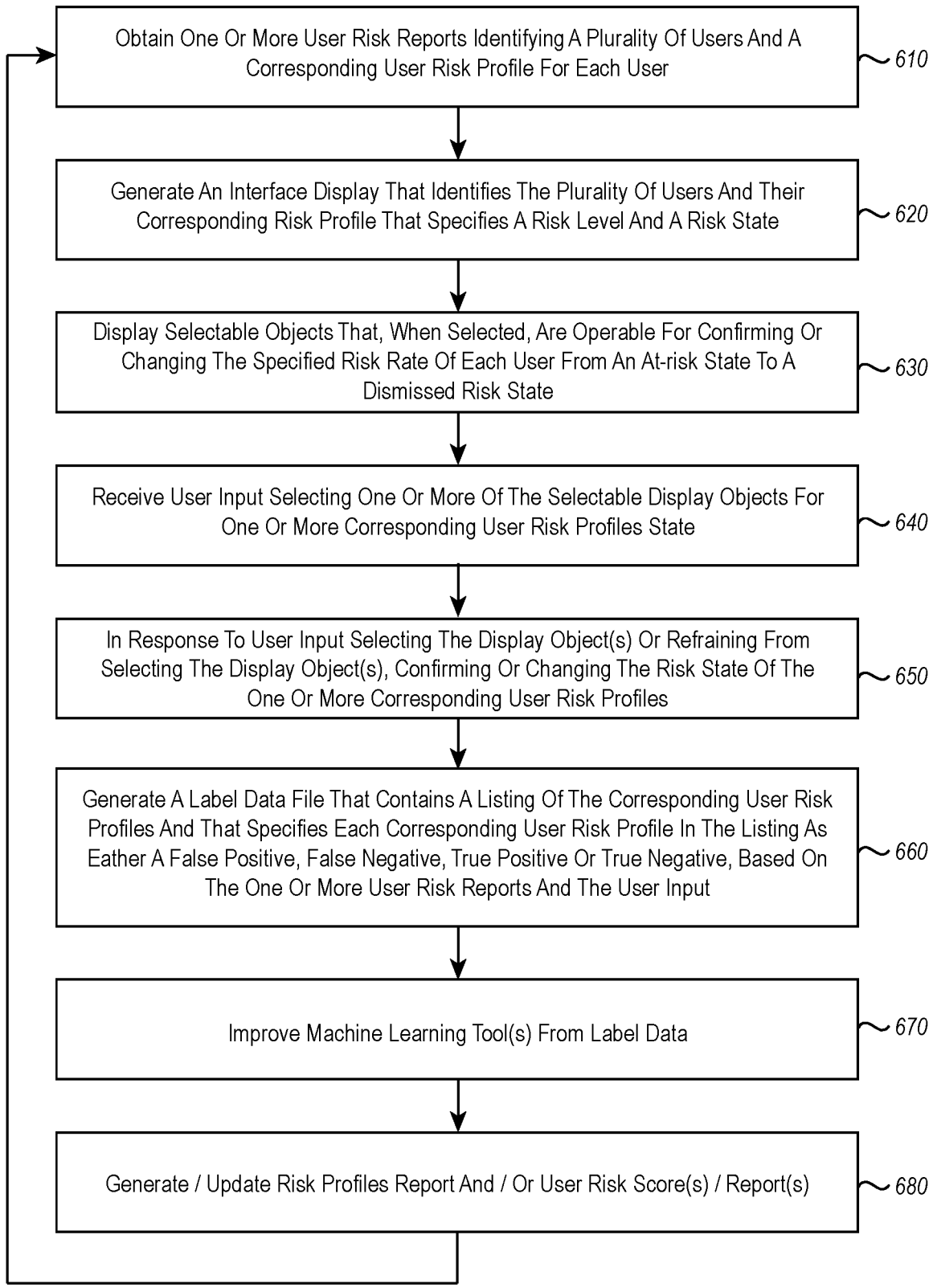
FIG. 6 illustrates a flowchart of acts associated with disclosed methods and embodiments for improving user identity protection and corresponding computer system security associated with user risk profiles.

Attention will now be directed to the figures, which illustrate various aspects of the disclosed embodiments. For instance, FIG. 1 illustrates an embodiment of a computer system 100 that may include or be used to implement the disclosed and claimed functionality of the invention. FIGS. 2-4 illustrate various embodiments of user interface elements that can be used to display and validate or change user risk profiles and sign-in profiles. FIGS. 5-6 illustrate various flowcharts and acts associated with improving security of computer systems that utilize sign-in risk profiles (FIG. 5) and user risk profiles (FIG. 6).

As shown in FIG. 1, the computer system 100 comprises a cloud service that includes multiple different computers, such as a cloud/service portal 110 that provides users access to one or more computer resources from one or more service/resource provider(s) 112 that are included within the cloud/service portal 110 or that are remotely located and/or distributed from the cloud/service portal 110. As mentioned above, the disclosed cloud/service portal 100 is a distributed system, in some instances, combining multiple different computer systems.

The users 114, which may comprise any combination of one or more entities and devices and device types, access the cloud/service portal 110 through one or more network connections 119. In some instances, the users comprise individual people having separate user accounts that correspond to a single device or, in some instances, to multiple devices. In other instances, the users comprise a group of people that share a common user account. The users 114 can be individuals or tenant organizations. Each user has a corresponding user identity that is associated with their account and that is, in some instances, mapped to a user risk score maintained by or accessible by the cloud/service portal 110 and/or linked systems.

In some instances, the users 114 are only able to access requested services/resources upon being authenticated and validated for the requested services/resources and, in some instances, upon a determination being made that the user account has a user risk score that is below a certain risk threshold and/or by determining that a sign-in risk score associated with a user request/sign-in is below a certain risk threshold (as will be described in more detail below).

The authentication and validation of a user account and their access rights may be performed, in some instances, by the user providing a required combination of credentials, which may include any combination of user login credentials (e.g., name and password), certificates, digital signatures, device identifiers, tokens and so forth. In some instances, no credentials are required.

At any time before, during or after the user makes the specific request for desired services/resources, the user may be required to provide the user/sign-in data 116, which may comprise any combination of the aforementioned identity credentials, as well as other user/sign-in profile data, such as the application or service that is being requested, an identification of the browser or application that is being used by the user, the identifier(s) of the user device(s), the location of the user and/or other device profile data (e.g., the ports being used, IP identifiers, and so forth), user biometrics, two factor authentication, a time of day, time since a last request, etc. This information may be explicitly asked of a user, such as through a user interface display. Alternatively, or additionally, the user/sign-in data 116 may be obtained without the user's knowledge, such as by the cloud/service portal 110 sending query packets to the user device and/or by examining the metadata in the message packets that are received from the user and without displaying a request to the user.

The user/sign-in data 116, which may be supplemented with additional +n identifiers that further identify attributes or patterns of the network connections (e.g., routing information, quantity of connections, transmission and transport protocols, etc.) is received by the communication module(s) 118 of the cloud/service portal 110 and passed to an authentication/detection server 120 that utilizes a risk assessment engine 122 to identify and evaluate the user risk profile and/or sign-in risk profile associated with the user request for services/resources. The sign-in data 116 may also be directly sent to the machine learning engine 130, for analysis and application by the machine learning engine 130 (which itself may be a part of the cloud/service portal 110). This is shown, for example, by lines 117 and 119.

The machine learning engine 130 uses the user/sign-in data 116 to further improve the machine learning module(s) or tool(s) 131 of the machine learning engine 130, to refine/train the machine learning tool(s) 131. The label data files 132 (which will be described in more detail below and which include any combination of one or more system(s) and/or one or more algorithm(s)) and other $3^{rd}$ party data 134 and supplemental user behavior analysis data 136 can also be used to further train and improve the machine learning tool(s) 131.

The machine learning tool(s) 131 comprise one or more modules and/or algorithms for analyzing and determining user/sign-in risk scores and other risk profiles. The machine learning tool(s) 131 may comprise or use, for example, multilayer neural networks, recursive neural networks, or deep neural networks that are trained with the user/sign-in data 116, label data files 132, $3^{rd}$ party data 134 and/or supplemental user behavior analysis data 136.

In some embodiments, the machine learning engine 130 and tool(s) 131 include or use ensemble or decision tree models, such as decision trees, random forests or gradient boosted trees that are trained with the user/sign-in data 116, label data files 132, $3^{rd}$ party data 134 and/or supplemental user behavior analysis data 136.

In some embodiments, the machine learning engine 130 and the machine learning tool(s) 131 include or use linear models such as linear regression, logistic regression, SVMs (support vector machines), etc., which are trained with the user/sign-in data 116, label data files 132, $3^{rd}$ party data 134 and/or supplemental user behavior analysis data 136.

The machine learning engine 130 and the machine learning tool(s) 131 may utilize any of the foregoing machine learning models and techniques.

It will be appreciated that the machine learning engine 130 may comprise a part of the cloud/service portal 100, as a service for example, even though it is shown outside of the box associated with the cloud/service portal 100. Likewise, the risk assessment engine 122 and the authentication/detection server 120 may also be a part of the cloud/service portal 110 or a remote and/or third-party system in communication with the cloud/service portal 110.

The risk assessment engine 122 evaluates the various user/sign-in data 116 to identify the user and to further identify patterns associated with the sign-in and account of the user. For instance, the authentication/detection server or cloud/service portal 110 is able to use the user/sign in data to detect whether the sign-in event is associated with a suspicious device, a new device, an atypical or typical location, an anonymous IP address, a familiar or unfamiliar IP address, with known to be leaked credentials, from a device infected with malware, from a location that is distant from a known location of a user, or other sign-in attribute.

These and/or other factors are compared by the risk assessment engine 122 to identify attributes/patterns in a risk profiles report 138 to determine an appropriate user risk score and/or sign-in event risk score (140) to associated with the corresponding user and/or sign-in event(s). This may require the generating of a new score or modifying existing scores 140, by the risk assessment engine 122, in real-time (dynamically based on detecting new user/sign-in data as it is received), or on demand, and by comparing the detected user/sign-in data 116 to the profiles/telemetry in the risk profiles report 138.

Once the risk score 140 is generated or modified, based on the new user/sign-in data 116, that risk score 140 can be provided to and/or used by any of the computer components (e.g., service/resource provider(s), communication module(s), or other components/systems) to control and restrict access to the requested services/resources based on the risk policies of the various systems, services and resources. If the risk score is too high, the user may be prevented from accessing requested resources or may be used to trigger any combination of proactive remediation steps, such as, but not limited to initiating a request for the user to perform additional authentication/verification by providing additional user/sign-in data. The risk score can also be used to trigger the expiry or demotion of access rights/privileges of a user account. In some instances, alternatively, the risk score is used to increase access rights, such as when the risk score is lowered as a result of the analysis by the risk assessment engine 122 and machine learning engine 130.

In some instances, the risk scores are provided to third parties (not shown), which are connected through the network connections to the cloud/service portal).

It will also be appreciated that the user risk scores and the sign-in risk scores may be used in combination or independently of one another to control access to the requested services/resources.

When a user is authorized to access the requested services/resources, based on the user risk score and/or sign-in risk score falling below a predetermined threshold, the cloud/service portal or service/resource provider(s) provide response data 139 to the user which contains the requested resource/service or at least a token or pointer for accessing the requested service/resource.

The foregoing process is even further improved by providing crowdsourced feedback loops for further refining and tuning the risk profiles in the risk profiles report with machine learning applied to label data that is generated by the crowdsourced feedback.

The crowdsourced feedback is provided, in some instances, based on explicit input received at interfaces that are used to display risky user reports and risky sign-in reports, as well as full user reports and full user sign-in reports.

As different user accounts are monitored, and their risk scores 140 are created and modified, these user accounts are tracked in a full user report 142. Likewise, the sign-in attempts (which may comprise any sign-in event, whether successful or not), may be monitored and logged in a full sign-in report 144 (also called a full sign on report). These full user and sign-in reports (142/144) can also be parsed and filtered to generate corresponding risky user reports (146) and risky sign-in reports (148) that only contain users and sign-in events that are determined to meet or exceed a predetermined certain risk threshold. Different risk thresholds and categorization schemes may also be used to accommodate different needs and preferences. For instance, the risk categorization scheme may label or value the different user risk profiles and sign-in risk profiles according to a high, medium, low scheme, a numerical range scheme, a binary risky/not risky scheme, or any other scheme.

The various risk reports (146/148) are presented to an administrator (or sometimes the user) to validate, change or refute/dismiss the particular risk label or value, via one or more UI (user interface) 150, thereby generating label data comprising indicators of false positives, true positives, false negatives and true negatives for the different user accounts and sign-in events. This label data is used as crowdsourcing feedback by one or more machine learning models/algorithms to further train the machine learning and to generate a new or updated risk profiles report that maps the various user patterns and sign-in patterns to different risk valuations.

For instance, when a particular user or sign-in event is labeled with a risky label/value and user input is received to indicate that the label is wrong (by challenging, changing or dismissing the risk label/value), a false positive indicator is generated and associated with that user/event in the label data contained in the one or more corresponding label data files (132). When fed into the machine learning engine, this will decrease the likelihood that similar user/event patterns will generate a risk level of the same magnitude as before for the same user/sign-in events, as well as for other users/sign-in events having the same or similar user/sign-in data.

Likewise, when the user input confirms or leaves the risky label unchanged/unchallenged, by selecting an option to validate the current label and/or by refraining to provide any input, a true positive indicator is generated and associated with that user/event in the label data. When fed into the machine learning engine, this will increase the likelihood that similar user/sign-in event patterns will generate a risk level of the same magnitude as before for the same user/sign-in events, as well as for other users/sign-in events having the same or similar user/sign-in data.

When a particular user or sign-in event is labeled with a non-risky label and user input is received to indicate that the label is wrong (by challenging, changing or adding a heightened risk label), a false negative indicator is generated and associated with that user/event in the label data. When fed into the machine learning engine, this will increase the likelihood that similar user/event patterns will generate a risk level of a greater magnitude as before for the same user/sign-in events, as well as for other users/sign-in events having the same or similar user/sign-in data.

Likewise, when the user input confirms or leaves the non-risky label unchanged/unchallenged, by selecting an option to validate the current label and/or by refraining from providing input, a true negative indicator is generated and associated with that user/event in the label data. When fed into the machine learning engine, this will increase the likelihood that similar user/sign-in event patterns will generate a similarly low or lower risk level as before for the same user/sign-in events, as well as for other users/sign-in events having the same or similar user/sign-in data.

As reflected by the additional storage containers 155, the various reports (i.e., risky user report, risky sign-in report, full user report, full sign-in report) may be contained in a single storage location (stored as one or more files). Alternatively, one or more of these reports may be distributed among a plurality of different storage containers and files. Likewise, different reports may be generated for different users and groups of users, including different reports for different enterprises or different subsets of users in the same or different enterprises.

Attention is now directed to FIGS. 2-4 which show different interface embodiments of a UI presentation of a risky sign-in report (FIGS. 2 and 3) and of a risky user report FIG. 4.

As shown in FIG. 2, a risky sign-in report interface 200 includes a listing of a plurality of different sign-in events 210, along with the corresponding telemetry/pattern data that associated with those events, including the user 212 associated with the sign-in event, an application 214 being used or requested with the sign-in, the success/failure state 216 of the sign-in event, the date 218 of the sign-in event, the IP address 220 of the device requesting the sign-in or the IP address of the host receiving the sign-in request, a sign-in risk state 222 (currently they all show 'at risk'), a sign-in risk level 224 corresponding to a recorded risk score (e.g., High, Medium or Low), a dynamic and real-time risk level 226 corresponding to a modified risk score based on new machine learning that is being applied in real-time. Various other telemetry data may also be provided, although not explicitly shown at this times, a reflected by ellipses 228. This additional telemetry data may include, but is not limited to, a status indicator of conditional access (indicating whether additional control restrictions were required and or applied), and whether multi-factor authentication was applied or not, and whether additional user behavior (e.g., multi-factor authentication) was successful or not.

In this regard, it will be appreciated that the various user interfaces shown and described in FIG. 2-4 may include various other fields of telemetry can be displayed, or less fields of telemetry can be displayed, corresponding to any of the detected user/sign-in data for the different users and sign-in events, to accommodate different needs and preferences. Likewise, various filtering tools, like the presented pulldown menus 230 can be used to filter the selection of users and sign-in events that are presented and their ordering/presentation format.

In some embodiments, each sign-in event can be selected, by receiving hover focus over a displayed sign-in event, by receiving a mouse click selection directed at highlighted sign-in event, or by another selection mechanism (e.g., check box, radio dial or other displayed selectable control object), or query field selection (not shown).

When a sign-in event is selected, a risk confirmation/challenge object 240 is displayed, which presents selectable display objects that are operable, when selected, to confirm a safe risk state (242) or to confirm a compromised state (246) of the corresponding sign-in event. Other displayed objects can also be used to enable a user to select the object(s) to confirm and/or change a risk state of a sign-in event, such as in response to selecting a pull-down menu 230 or entering data in an input field 232 that identifies a user. Then, depending on the user input received, and/or not received, for each sign-in event, a corresponding identifier of label data (e.g., false positive, false negative, true positive, false positive) can be generated for that sign-in event. This label data can be compiled into a label data file that contains label data for a plurality of sign-in events.

It will be appreciated that the label data can be sent in real-time to the Machine Learning Engine, automatically and dynamically in response to detected user input, or in batches at predetermined periods and/or periodically on demand.

In some instances, a group of different events can be selected (e.g., by selecting radio dial objects, check boxes, etc.) and or by selecting a plurality of events for a single user or multiple users via the pull-down options 230 and/or input field(s) 232. Whether a single event is selected (as shown), or a plurality of different event(s) are selected (not shown), that single event and/or group of selected events can be individually and/or collectively confirmed safe or confirmed compromised by providing selection user input directed at one of the displayed selectable objects 210 that are presented when the single event/group of events is selected. Likewise, other selectable objects 243/245 at different locations on the interface, which may be persistently displayed as part of a ribbon or menu bar 250 can be selected to provide the user input.

FIG. 3 illustrates another interface 300 embodiment, which provides additional selectable objects 310 for enabling a user to provide user input comprising crowd-sourced feedback that is used to validate, challenge or change the risk label/value associated with a particular sign-in event. This set of selectable display objects 310 is presented within a frame of additional sign-in event telemetry that is provided, in this embodiment, to give additional details about a logged sign-in event for a particular sign-in event that is selected from the primary listing of sign-in events.

FIG. 4 illustrates an embodiment of a risky users report interface 400, wherein a list of users is presented with corresponding user name, state, risk level, timing of last update and other information corresponding to the user and stored user risk profile. The displayed user data may vary to accommodate different needs and preferences and may include more or less than the information shown, including any combination of user data that is detectable and stored for the user, including sign-in data.

In some embodiments, each user listed in the interface 400 can be selected, by hover focus, prompt selection (e.g., check box, radio dial or other displayed selectable control object), or query field selection (not shown), as described above, with regard to the interface 300 of FIG. 3. When a user is selected, a risk confirmation/challenge object 420 may be displayed, which presents selectable display objects 424 that are operable, when selected, to confirm a risk state, dismiss a risk state or to otherwise modify a risk state, respectively, associated with the user. Then, depending on the user input received or not received for each user, a corresponding identifier of label data (e.g., false positive, false negative, true positive, false positive) can be generated for that user, as generally described above. For instance, selecting a confirm risk for the user Alvin will result in generating a true positive indicator for that user/risk score. If Alvin had a high-risk level, which was confirmed, this would generate a true negative indicator. In contrast, selecting a dismiss object (if Alvin had a 'high' risk level) would result in generating a false negative indicator. Selecting a modify object may trigger an additional display for selecting an appropriate risk level. Then, depending of if the risk level selected is higher or lower, the system could generate correspondingly false positive or false negative indicator(s), respectively.

It will be appreciated that the label data can be sent in real-time to the Machine Learning Engine, automatically and dynamically in response to detected user input, or in batches at predetermined periods and/or periodically on demand.

In some instances, a group of different users can be selected to confirm, dismiss or change the risk label/level associated with the selected user(s), by providing selection user input directed at one of the displayed selectable objects associated with the risk label/level.

In FIG. 4, a selectable dismiss risk object 410 is presented in response to selecting a particular user or group of users. In the current embodiment, the selectable object is presented with other telemetry data associated with the user risk profile of the selected user. The dismiss risk object 410 may also be used to trigger the generation of a false negative indicator (for a user that previously had a high or medium risk level).

Attention will now be directed to FIGS. 5 and 6, which illustrate various flowcharts (500 and 600) comprising various acts included in or associated with the discloses methods for improving computer security by using crowdsourced feedback loops. It will be appreciated that while the method acts may be discussed in a certain order or illustrated in a flowchart as occurring in a particular order, no particular ordering is required unless specifically stated, or required because an act is dependent on another act being completed prior to the act being performed.

FIG. 5 illustrates a flowchart 500 that is associated with methods that are specifically associated with improving computer system security for computer systems that base their security at least partially on sign-in risk profiles. As shown, these embodiments include a computer system obtaining one or more sign-in reports identifying a plurality of sign-in attempts and a corresponding sign-in risk profile for each sign-in attempt of the plurality of sign-in attempts (act 510).

Then, the computer generates an interface display that identifies the plurality of sign-in attempts and the sign-in risk profile for each corresponding sign-in attempt (act 520), along with selectable display objects that are operable, when selected (or not selected), to confirm or challenge the corresponding user risk profile (act 530). In some instances, this includes labeling the sign-in risk profile as either at risk or safe. Next, user input is received for selecting one or more of the selectable display objects for one or more corresponding sign-in risk profiles (act 540) and the computer system, responsively, confirms or modifies the listed risk profile. This may include, for example, designating the one or more corresponding sign-in risk profiles as either a confirmed safe sign-in risk profile or, alternatively, a confirmed compromised (e.g., at risk or risky) sign-in risk profile (act 550). Other labels and risk values can also be used to reflect relative risk.

Next, the computer system generates a label data file that contains a listing of the corresponding sign-in risk profiles that have been confirmed or modified (e.g., confirmed safe and/or confirmed compromised) and that specifies each corresponding sign-in risk profile in the listing as either a false positive, false negative, true positive or true negative, based on the one or more sign-in risk reports and the user input (act 560). Finally, the machine learning engine is improved/modified by causing the machine learning tools used by the machine learning engine to learn/apply the labeled data in the label data file to the machine learning engine and in such a way that the machine learning is enabled to generate or modify a risk profiles report that is used by a risk assessment engine to generate sign-in risk scores (act 580). These risk scores are then used to generate or update the one or more sign-in risk reports obtained by the computing system for real-time use or subsequent use (act 580).

FIG. 6 illustrates a related embodiment, which may be practiced alone, or in combination with the embodiment shown in FIG. 5.

As shown, FIG. 6 illustrate a flowchart 600 of methods that are specifically related to improving computer security for computer systems that are associated with user risk profiles. The first act includes a computer system obtaining one or more user risk reports identifying a plurality of users and a corresponding user risk profile for each user in the plurality of users (act 610). Next, the computer system generates an interface display that identifies the plurality of users in the one or more user risk reports and their corresponding risk profile that specifies a risk level and a risk state (act 620), along with one or more selectable display objects that, when selected, are operable for changing the specified risk state of each user (act 630). This may include, for example, changing a risk state from an at risk state to a dismissed risk state or from a no risk state to a risk state.

Then, upon receiving user input selecting one or more of the selectable display objects for one or more corresponding user risk profiles (act 640) and/or in response to receiving no input for confirming an existing risk state, the computing system responsively confirms and/or changes the risk state of the one or more corresponding user risk profiles (act 650). In some instances, the user may refrain from providing any input for changing a risk state, thereby confirming the risk state.

Thereafter, the computing system generates a label data file that contains a listing of the corresponding user risk profiles and that specifies each corresponding user risk profile in the listing as either a false positive, false negative, true positive or true negative, based on the one or more user risk reports and the user input (act 660). The machine learning engine is then improved/modified by causing the machine learning tools utilized by the machine learning engine to learn/apply the labeled data in the label data file to the machine learning engine (act 670) and in such a way that the machine learning engine/tools are enabled to generate or modify a risk profiles report that is used by a risk assessment engine to generate user risk scores (act 680). These user risk scores are then used to generate or update the one or more user risk reports automatically and dynamically in real-time and/or on demand (act 680).

In some embodiments, each of the foregoing processes are performed iteratively and, in some instances, in combination. Also, the user input and risk profiles are sometimes associated with different organizations, thereby providing enhanced crowdsourced feedback that is used as training data for the machine learning systems to more dynamically and responsively update the user risk profiles and the sign-in risk profiles in a manner that can significantly improve user identification protections, as well as computer system security systems that rely on such risk profiles.

For purposes of illustration of some of the benefits that can be achieved for improving computer security for systems that utilize user and sign-in profiles, a few use examples will be provided.

In one embodiment, for example, the modification of a first user risk profile (based on crowdsourced user input), such as changing a first user risk profile from an at risk state to a dismissed risk state could result in a modification of a second user risk profile in a same or different risk report associated with a different/second user, based on the machine learning applied to the corresponding label data that is generated in response to the user input. This is true, in some embodiments, regardless of whether the users belong to the same organization or different organization, and even when these profile risk scores are used to grant or deny access to one or more organization resources.

In some instances, the granting of resources to a requesting user will also result in the modification of a risk score to that same user or a different user (of a same or different organization).

In some embodiment, user input is received at the user interface of a sign-in risk report causing a first sign-in risk profile to be designated with either a confirmed safe sign-in risk profile or, alternatively, a confirmed compromised sign-in risk profile and this results in the computing system responsively modifying a second sign-in risk profile in the one or more sign-in risk reports that is associated with a second logged sign-in to be a different status or risk level, based on the user input selecting the one or more selectable display objects for the first sign-in risk profile of the first logged sign-in.

In some instances, the foregoing example occurs when the first logged sign-in event and the second logged sign-in event comprise separate logged sign-ins for a same user account. In other instance, the logged sign-in events occur for different user accounts of a same user. In yet other instances, the logged sign-in events comprise separate logged sign-ins for accounts belonging to different users of a same organization or a different organization, wherein the sign-in risk profiles are used by the same or different organizations, respectively, to determine whether to grant or deny the different users access to the organization resources.

In another example, a first sign-in request is received from a first user and a first sign-in profile associated with the first sign-in request is identified based on sign-in profile data included with the first sign-in request and is presented in a sign-in risk profiles report. The user's request is also granted or denied, based on the first sign-in risk score. Then, based on subsequent input from the computing system to confirm or modify the sign-in risk score (such as by presenting the report and selectable options), the user input is received, which confirms or modifies the sign-in risk and causes a new or updated label data file to be generated. Machine learning is applied to the label data file, with or without a previous risk profile report, to generate or update a risk profile report that is subsequently used to create/modify one or more sign-in event records and risk scores and/or user risk profiles.

In view of the foregoing description, it will be appreciated that the disclosed methods and systems can be used to improve the manner in which computer security is implemented, particularly for computer systems that utilize user risk profiles and sign-in risk profiles to implement their security systems.

The disclosed embodiments can be particularly useful for enabling each of the customers of a system to benefit from the feedback given by other customers of the same system. This benefit will multiply as the quantity of customers within the system, such as Microsoft's Azure Active Directory system, or any other system, grows. In particular, the feedback that is provided by the different customers across a system (which may be received throughout the world in some instances), can lead to an identification of an attacker based on various factors (e.g., IP, browser, location, cookies, network, etc.) and that can be used in the disclosed crowdsourced feedback loops to help prevent attacks to other customers in near real-time. In other words, it is not just the machine learning algorithms that are tuned and that benefit from the feedback, but actual customers in near real-time.

It will also be appreciated that the disclosed systems and methods do more than merely restrict access to content. But, they can also be used to provide proactive remediation of risk through credential resets, credential expiation and credential demotion.

Finally, it will also be appreciated that the foregoing description of providing computer system security comprises or includes providing specific 'identity' security, by helping to provide identity scores or identity risk scores that are dynamically updated in view of crowdsourced feedback and that are, therefore, usable to help improve the precision and recall of the identity scores.

The foregoing methods may be practiced by a computer system, such as the computing system described in reference to FIG. 1 and which may include one or more processors (not illustrated) and computer-readable media such as computer memory. In particular, the computer memory may store computer-executable instructions that when executed by one or more processors cause various functions to be performed, such as the acts recited in the embodiments.

In this regard, the disclosed embodiments may comprise or utilize a special purpose or general-purpose computer or computing system (including distributed cloud service systems) and which include computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
one or more processors; and
one or more computer-readable hardware storage devices having stored thereon instructions that are executable by the one or more processors to configure the computer system to implement a method of improving computer system security, including instructions that are executable to configure the computer system to implement the method by performing at least the following:
obtain one or more user risk reports identifying a plurality of users and a corresponding user risk profile for each user in the plurality of users;
generate an interface display that identifies the plurality of users in the one or more user risk reports and a corresponding risk profile, for each user, that specifies a risk level and a risk state, along with one or more selectable display objects that, when selected, are operable for confirming or changing the specified risk state of each user, the risk level for each of the plurality of users being selected from a set of risk levels that include at least a high risk level, a low risk level and a medium risk level;
receive first crowdsourcing user input selecting one or more of the selectable display objects for one or more corresponding user risk profiles and, responsively, presenting three different options, including a confirming option for confirming, a dismissing option for dismissing, and a modifying option for modifying the user risk profiles associated with the one or more of the selectable display objects;
receive second crowdsourcing user input selecting either the confirming option, the dismissing option or the modifying option;
generate a label data file that contains a listing of the corresponding user risk profiles and that specifies each corresponding user risk profile in the listing as either a false positive, false negative, true positive or true negative, based on the one or more user risk reports and the second crowdsourcing user input, wherein when the second crowdsourcing user input confirms the high risk level for a particular user risk profile the second crowdsourcing user input causes the generation of a corresponding true negative user risk profile in the listing, and wherein when the second crowdsourcing user input dismisses the high risk level for the particular user risk profile or modifies the high risk level to the medium risk level or the low risk level, the second crowdsourcing user input causes the generation of a corresponding false negative user risk profile in the listing; and
improve or modify a machine learning tool with the label data file and which machine learning tool is used to generate or modify a risk profiles report that is used by a risk assessment engine to generate user risk scores, and wherein the user risk scores are used to generate or update the one or more user risk reports.

2. The computer system of claim 1, wherein the method further includes:
receiving user input selecting the one or more selectable display objects for a first user risk profile of a first user;
responsively causing a risk state of the first user risk profile of the first user to be changed from an at risk state to a dismissed risk state; and
modifying a second user risk profile in the one or more user risk reports that is associated with a second user, based on the user input causing the risk state of the first user risk profile of the first user to be changed from an at risk state to a dismissed risk state.

3. The computer system of claim 2, wherein the first user and the second user comprise user accounts belonging to a same organization and wherein the first user risk profile and the second user risk profile are risk profiles used by the same organization to determine whether to grant or deny access to one or more organization resources.

4. The computer system of claim 2, wherein the first user comprises a user account belonging to a first organization and the second user comprises a user account belonging to a second organization, wherein the first user risk profile is used by the first organization to determine whether to grant or deny the first user access to one or more resources of the first organization and wherein the second user risk profile is used by the second organization to determine whether to grant or deny the second user access to one or more resources of the second organization.

5. The computer system of claim 1, wherein the method further comprises:
receiving a first user request;
identifying a first user associated with the first user request based on user profile data included with the first user request;
determining a first user risk profile for the user based on the risk profiles report;
responsively granting or denying the first user request based on the first user risk profile;
requesting user input confirming a risk state of the first user profile or, alternatively, changing the risk state, the request being based on granting or denying the first user request;
receiving the requested user input and generating or updating a label data file based on the user input; and
provide the label data file to the machine learning tool to update a particular profile associated with the first user in the risky profiles report and to thereby generate an updated risky profiles report.

6. The computer system of claim 5, wherein the method further comprises modifying the first user risk profile based on the updated risky profiles report.

7. The computer system of claim 6, wherein the method further comprises modifying a different user risk profile of a different user based on the update to the particular profile in the updated risky profiles report.

8. The computer system of claim 5, wherein the user profile data comprises at least one of user login credentials, an application or service being requested, a browser being used by the user, a device identifier, an IP address associated with the request, a location of the request, detected device configurations or network connections used to make the request.

9. The computer system of claim 1, wherein the one or more user risk reports comprises a separate risky user report for each of a plurality of different tenant organizations.

10. The computer system of claim 1, wherein the one or more sign-in risk reports comprises a separate risky sign-in report for each of a plurality of different tenant organizations.

11. A computing system comprising:
one or more processors; and
one or more computer-readable hardware storage devices having stored thereon instructions that are executable by the one or more processors to configure the computer system to implement a method of improving computer system security, including instructions that are executable to configure the computer system to implement the method by performing at least the following:
obtain one or more sign-in reports identifying a plurality of sign-in attempts and a corresponding sign-in risk profile for each sign-in attempt of the plurality of sign-in attempts;
generate an interface display that identifies the plurality of sign-in attempts and the sign-in risk profile for each corresponding sign-in attempt, along with selectable display objects that are operable, when selected, confirm or change the sign-in risk profile;
receive first crowdsourcing user input selecting a plurality of sign-in attempts for a plurality of different users;
receive second crowdsourcing user input and collectively confirm or change the sign-in risk profile of all of the selected plurality of sign-in attempts concurrently based on the second crowdsourcing user input;
generate a label data file that contains a listing of the corresponding sign-in risk profiles, each of the one or more sign-in risk profiles being identified in the listing as either confirmed safe or confirmed compromised, each corresponding sign-in risk profile in the listing also being specified as either a false positive, false negative, true positive or true negative, based on the one or more sign-in risk reports and the second user input that collectively confirmed or changed the sign-in risk profile for the selected plurality of sign-in attempts; and
generate or modify a risk profiles report with a machine learning tool that is trained on the label data file, the risk profile report being used by a risk assessment engine to generate sign-in risk scores, and wherein the sign-in risk scores are used to generate or update the one or more sign-in risk reports.

12. The computer system of claim 11, wherein the method further includes:
receiving user input selecting the one or more selectable display objects for a first sign-in risk profile of a first logged sign-in;
responsively causing the first sign-in risk profile to be designated with either a confirmed safe sign-in risk profile or, alternatively, a confirmed compromised sign-in risk profile; and
modifying a second sign-in risk profile in the one or more sign-in risk reports that is associated with a second logged sign-in to be a different status or risk level, based on the user input selecting the one or more selectable display objects for the first sign-in risk profile of the first logged sign-in.

13. The computer system of claim 12, wherein the first logged sign-in and the second logged sign-in comprise separate logged sign-ins for a same user account.

14. The computer system of claim 12, wherein the first logged sign-in and the second logged sign-in comprise separate logged sign-ins for different user accounts of a same user.

15. The computer system of claim 12, wherein the first logged sign-in and the second logged sign-in comprise separate logged sign-ins for accounts belonging to different users of a same organization and wherein the first sign-in risk profile and the second sign-in risk profile are both used by the same organization to determine whether to grant or deny the different users, respectively, access to one or more organization resources.

16. The computer system of claim 12, wherein the first logged sign-in corresponds to a first user belonging to a first organization and the second logged sign-in corresponds to a second user belonging to a second organization, wherein the first sign-in profile is used by the first organization to determine whether to grant or deny the first user access to one or more resources of the first organization and wherein the second sign-in risk profile is used by the second organization to determine whether to grant or deny the second user access to one or more resources of the second organization.

17. The computer system of claim 16, wherein the method further comprises modifying a different sign-in risk score associated with a sign-in request of a different user than the first user and based on the update to the particular profile in the updated risky profiles report.

18. The computer system of claim 11, wherein the method further comprises:
   receiving a first sign-in request from a first user;
   identifying a first sign-in profile associated with the first sign-in request based on sign-in profile data included with the first sign-in request;
   determining a first sign-in risk score for the first sign-in based on the sign-in risk profiles report;
   responsively granting or denying the first sign-in request based on the first sign-in risk score;
   requesting user input designating the first sign-in request as either a confirmed safe sign-in risk profile or a confirmed compromised sign-in profile, the request being based on granting or denying the first sign-in request;
   receiving the requested user input and generating or updating a label data file based on the user input; and
   generate an updated risky profiles report with a machine learning tool based on the label data file.

19. The computer system of claim 18, wherein the method further comprises modifying the first sign-in risk score based on the updated risky profiles report.

20. The computer system of claim 18, wherein the sign-in profile data comprises at least one of user login credentials, an application or service being requested, a browser being used by the user, a device identifier, an IP address associated with the request, a location of the request, detected device configurations or network connections used to make the request.

* * * * *